June 5, 1962  W. STOLTZ  3,037,351
COMBUSTION TURBINE
Filed May 14, 1956  3 Sheets-Sheet 3
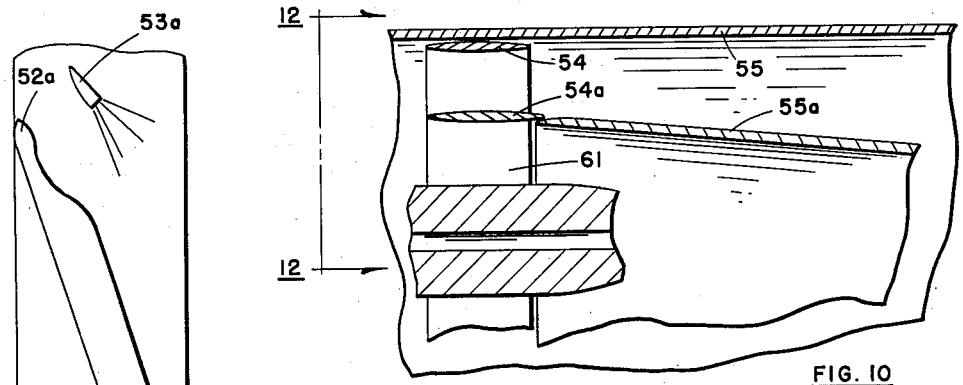
FIG. 9
FIG. 10
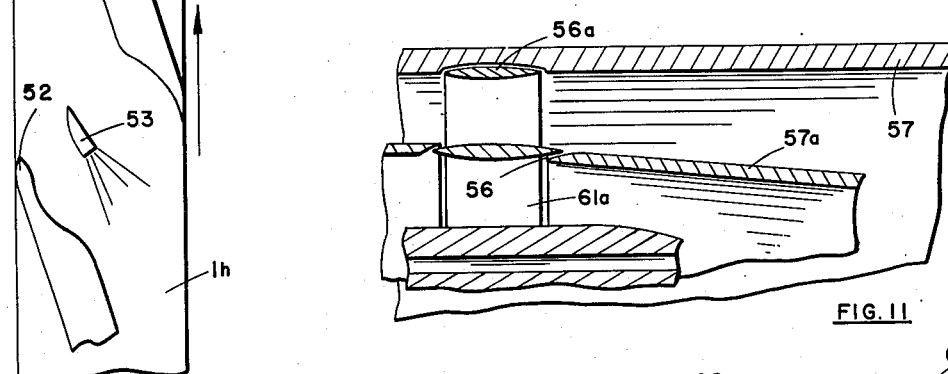
FIG. 11
FIG. 13
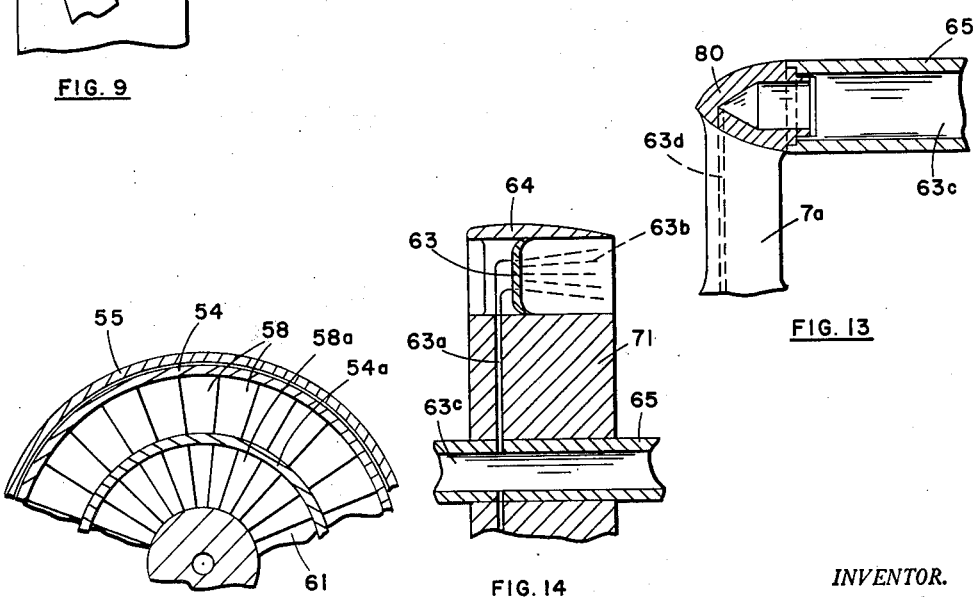
FIG. 12
FIG. 14
*INVENTOR.*
WERNER STOLTZ
BY
*Eugene O. Weber*
ATTORNEY 3,037,351
COMBUSTION TURBINE
Werner Stoltz, Berlin, Kladow, Germany, assignor of one-half to Paul O. Tobeler, doing business as Trans-Oceanic, Los Angeles, Calif.
Filed May 14, 1956, Ser. No. 584,747
8 Claims. (Cl. 60—39.35)

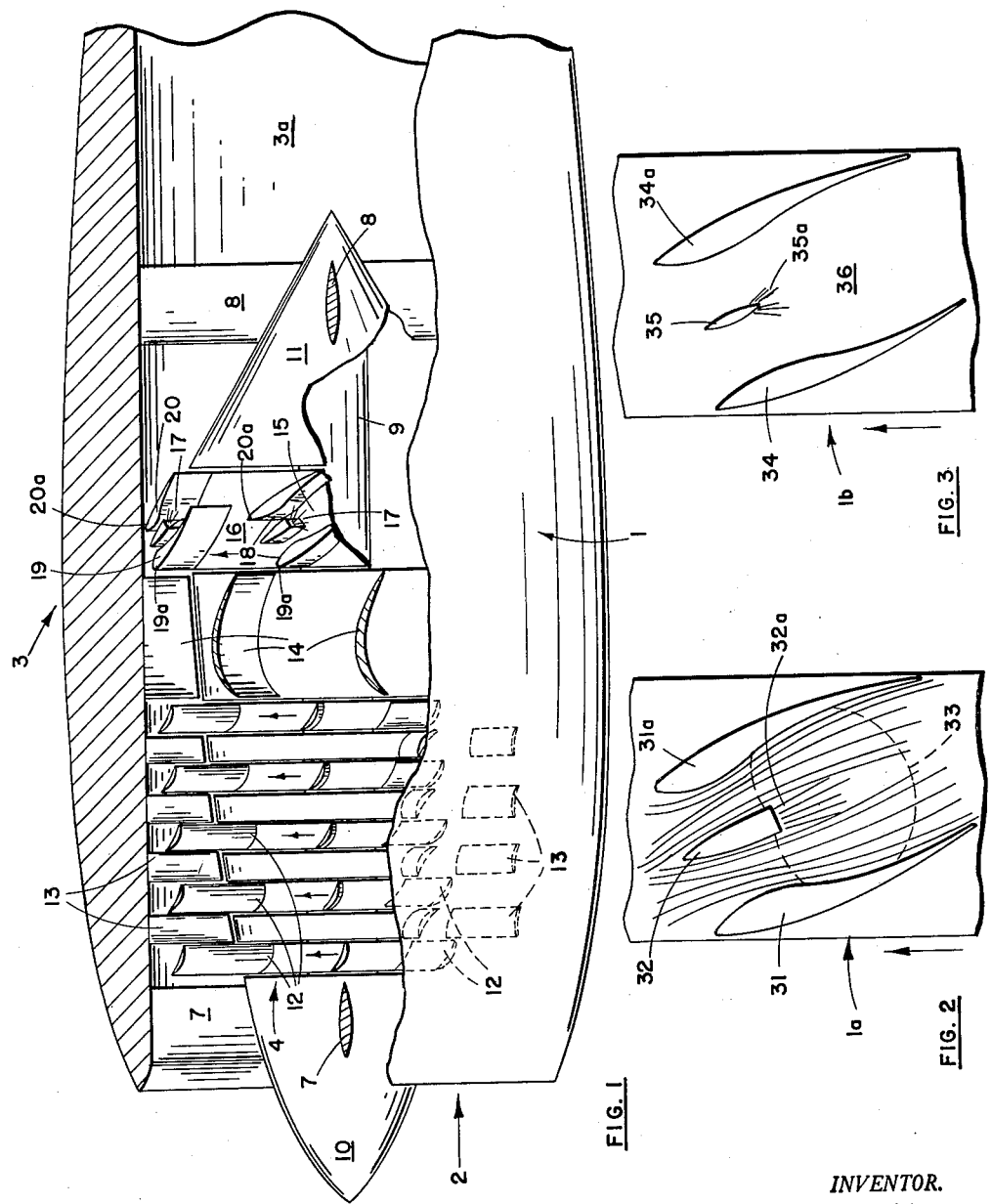

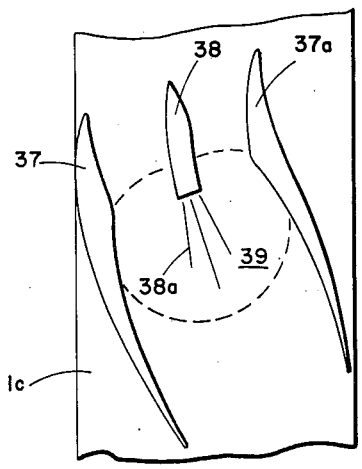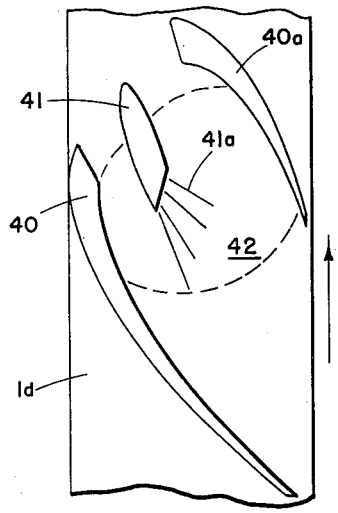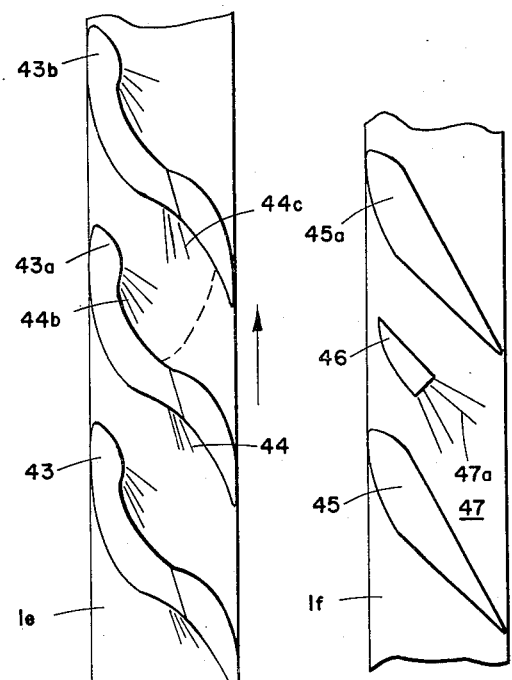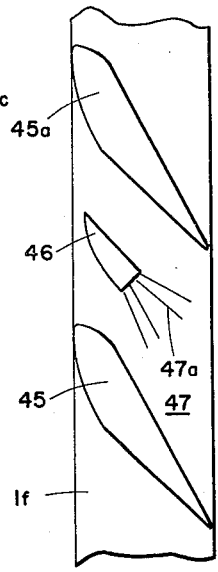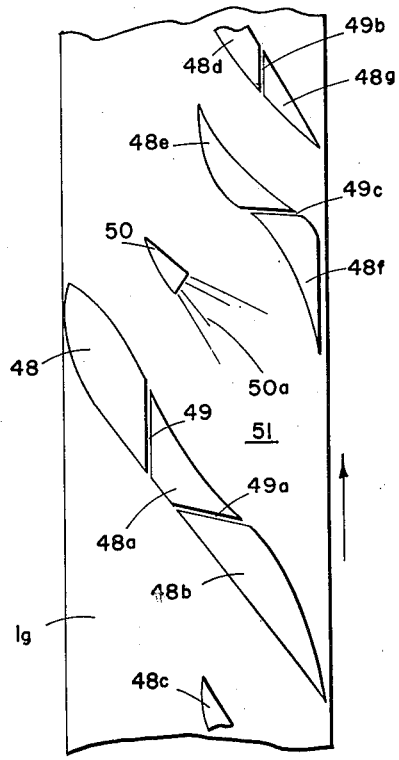

This invention relates to a combustion turbine which has individual combustion chambers on the periphery of the turbine wheel, the combustion in said chambers having a jet effect causing the rotation of said turbine wheel and the building up of a high pressure area on the discharge side of said combustion chambers.

In the prior art, to avoid the trouble caused by high temperatures in reaction combustion turbines, hollow guide vanes, buckets and axles have been used and they have been cooled in the operation of said turbines by the air streams passing over them. However, these turbines are economical only if Mach 1 or higher air speeds are achieved. In these turbines the combustion areas may be placed on the ends of the guide vanes or buckets to avoid the high temperatures directly on them, but this limits the efficiency as a turbine is then only actuated by reaction.

The present invention eliminates the inefficiency of reaction and maintains relatively low temperatures in the buckets or guide vanes. The invention comprises generally of having individual combustion chambers on the periphery of the turbine wheel. These combustion chambers are formed by two guide vanes, situated side by side, and having the chamber between them. Each of them has one end directed toward the incoming gases, said ends being generally tongue-shaped. The internal surfaces extending away from said ends are directed inwardly in the chambers to narrow the distance between the two vanes to the point adjacent where the fuel is injected. Extending from the point where the fuel is injected, the distance between the vanes is widened to form a small combustion chamber, after which the two vanes are shaped to again narrow the distance between them to form a jet through which the gases from said combustion are discharged. The vanes are placed to have an acute angle with the axis of the axle of said wheel and to discharge in a direction generally away from the direction of the rotation of the wheel.

It is contemplated in this invention to decrease the engine size to about one quarter the size of those used in the prior art by making use of the circumferential velocity of the driving bucket wheel and by exploiting the compression pressure developed in these buckets, thereby eliminating the need for a compressor. However, a compressor may be used in combination with the present invention.

Another object of the present invention is the elimination of a main combustion chamber by putting individual small combustion chambers between the buckets on the turbine wheel. This makes possible an increase of the combustion temperature to 1,000° C. as compared with 750° C. in the prior art. This is possible because the bucket or vane noses are not submitted to the high temperatures of the combustion gases as the high temperatures are formed behind the noses in the individual chambers.

It is another object of this invention to eliminate complicated operational controls.

It is a principal object of this invention to shorten the overall length of turbine engines, whether a compressor is used or not, thereby reducing shaft and bearing wear.

It is a further object of this invention to simplify the construction of the combustion turbine engine.

It is a still further object of this invention to provide a high total efficiency increase in combustion turbines.

Other objects of invention will become apparent in the following description taken in connection with the accompanying drawings, in which FIG. 1 is an elevational view of a combustion turbine engine, having a compressor and an after burner;

FIGS. 2–9 are sectional plan views of various embodiments of individual combustion chambers situated on the periphery of the combustion turbine wheel;

FIG. 10 is a cross section view of the turbine wheel having two levels of chambers on the periphery thereof;

FIG. 11 is another embodiment of the invention as shown in FIG. 10;

FIG. 12 is a schematic view along the lines 12—12 of FIG. 10;

FIG. 13 is a cross sectional view of the nose of the engine and the axle, showing the fuel supply passages into the hollow axle; and FIG. 14 is a cross sectional view of a turbine wheel having only one level of combustion chambers, showing the fuel passage to a chamber.

In FIG. 1, combustion turbine engine and after burner 3 has compressor 4, and combustion turbine wheel 1 with a common axle 9. The engine and after burner are situated in a cowling, as may be found in a jet aircraft, and are supported therein by supports 7 on nose 10 and supports 8 in rear support assembly 11. Axle 9, on which blades 12 of compressor 4 and turbine wheel 1 rotate, is bearing mounted in nose 10 and rear support assembly 11. Stationary blades 13 of compressor 4 are arranged alternatively between rotating blades 12 and are secured to the cowling. Air or gas inlet 2 allows air to enter the compressor where it is compressed by the action of the rotating blades forcing it through the passages of the stationary blades. From the latter, the compressed air passes into a row of stationary vanes or buckets 14, and thence into the combustion chambers 15 and the air spaces 16 between them. Fuel 17 is injected into combustion chambers 15, just inside narrow portion 18, between guide vanes 19 and 20 which form combustion chambers 15.

Vanes 19 and 20, secured to the periphery of the turbine wheel and extending therefrom outward in a generally radial direction, are of similar shape, except that they are reversed to have the two external faces of corresponding shape and the two internal faces of corresponding shape. Forward ends 19a and 20a of vanes 19 and 20, directed toward the compressor, are generally tongue-shaped and the surfaces extending rearward from them toward the after burner are at a generally acute angle to the axis of the axle. The shape of the ends 19a and 20a and their angular arrangement relative to the rotation at the turbine effect a compression on the incoming gas. If the gas is already compressed, prior to entering the guide vanes, as in FIG. 1, it is further compressed on entering the latter vanes. After being compressed by the vanes, the gas is caused to enter the combustion chamber in a spiral configuration.

The compression required for good combustion in chambers 15 can be obtained by the rotation of the turbine wheel 1 due to the shape of the guide vanes 19 and 20, and additional compression is not necessary. In other words, according to the present invention, compressor 4 is not required to achieve combustion in chambers 15. To develop the proper compression for combustion without a compressor, and before the turbine has reached a high speed, the guide vanes 19 and 20, as described above, are shaped to form an enlarged space between them just aft of the fuel injection point. This configuration provides adequate compression for combustion, even if the compression of the combustible gases, at a point before entering the guide vanes, is not sufficient for combustion; that is, if no compressor is provided. If the vanes are shaped not to form an enlarged space between them as the combustion chambers, the rotating speed of the turbine must be greater to produce the exact compression required for combustion. The discharge end 21 of the combustion chambers may be made smaller to have a better jet effect and to cause a better injection effect for the unburned air passing through air spaces 16 which are external of the combustion chambers; that is, between the individual chambers.

The speed of the air through the turbine is not required to be below the speed of sound but can be equivalent to the speed in the usual turbine where the combustion occurs before entering the guide vanes or blades. Here the improvement is in the better cooling of the guide vanes; that is, the front of the guide vanes are not affected by the heat of combustion, and because of this many materials may be used without the usual overheating problems.

The slip of the injected fuel jet may be diminished by accelerating the compressed air to the speed of the injected fuel, this effect being impossible in ordinary turbines.

Now referring to FIGS. 2–9 which are enlarged views of various embodiments of the invention which may be used for combustion with or without a compressor. The vanes forming the individual combustion chambers are all shown in cross sectional plan views on portions of turbine wheels, such as wheel 1. Shrouding may or may not connect the top of the individual vanes. In FIG. 2, on the periphery of wheel 1a, there are pairs of tongue-shaped vanes 31 and 31a of similar, but reversed configuration, showing an inlet which narows to cause a compression on the incoming air and then broadens to form combustion chamber 33. After the combustion chamber 33, the distance between the vanes is again narrowed to have a jet effect on the burned gases, which pass through the vanes generally toward the right side of the drawing and toward an after burner when provided.

Fuel 32a is injected into combustion chamber 33 from an end of fueling vane 32 which is directed into the chamber. The fuel 32a can be piped through the vane from a hollow axle, described below, and ejected into the combustion chambers by centrifugal force. The fueling vanes, as the guide vanes, have configurations that are desirable for good aerodynamic flow.

In FIG. 3 is shown another configuration of guide vanes 34 and 34a situated on the periphery of turbine wheel 1b. They form combustion chamber 36 and have fueling vane 35 between them, ejecting fuel 35a from the sides of the vane instead of out the rear end, as shown in FIG. 1.

In FIG. 4 another variation of the guide vane configuration is shown on wheel 1c. Guide vanes 37 and 37a have combustion chamber 39 formed there between and fueling vane 38 is ejecting fuel through one end, which is in the combustion chamber.

In FIG. 5 another set of vanes 40 and 40a are shown forming combustion chamber 42. Fueling vanes 41 are injecting fuel 41a into the combustion chamber from an oblique angle to better center the fuel in the combustion chamber. The vanes 40 and 40a are at a smaller acute angle with the axle axis of wheel 1d.

In FIG. 6 is shown a portion of the periphery of turbine wheel 1e, having guide vanes 43, 43a and 43b, radially directed therefrom. All are of similar configuration and may be made of a plurality of parts. In this embodiment there is no centrally located fueling vane but the fuel is ejected from any one of the guide vanes, as fuel 44 from vane 43a, fuel 44a from vane 43b, and fuel 44b from vane 43a. The combustion chambers are situated side by side with no space for passage of unburned air between the individual chambers.

In FIG. 7 is a modification of the embodiment shown in FIG. 6, the chambers again being side by side on the periphery of the wheel 1–f. Between vanes 45 and 45a is a fueling vane 46 from which fuel 47a is injected into the combustion chamber 47. The temperature on the front or inlet ends of vanes 45, 45a and 46, is more moderate than the temperature on the inlet ends of the guide vanes in FIG. 6.

In FIG. 8, on wheel 1–g, is a combustion chamber formed on one side by vanes 48, 48a and 48b, and on the other side by vanes 48e and 48f. Between the vanes are cooling slits 49, 49a and 49c. Fuel 50a is injected into chamber 51 from fueling vane 50 which is located in the narrow portion between the guide vanes. External of the fueling chamber are guide vanes 48c on one side, and 48d and 48g on the other, these also being made of a plurality of parts and also having a cooling slit 49b between 48d and 48g. The slits avoid swirling caused by separation of the gases. The external vanes are for guiding the cooling gases around the combustion chambers.

FIG. 9 shows a portion of turbine wheel 1h on which the combustion chambers are relatively smaller and more restricted, by guide vanes 52 and 52a, than the chambers in the other embodiments. Between vanes 52 and 52a is fueling vane 53, and between vane 52a and a vane, not shown, is fueling vane 53a. Here the vanes are closer together and form combustion chambers in places where the distance between them is enlarged. The vanes are of somewhat different shape to allow for more combustion chambers on the periphery of the wheel 1h. This configuration is desirable to reduce the mass flow through the turbine and where is is not necessary to conduct cooling air between the individual chambers.

In FIG. 10 is shown a side view of a turbine engine made of one wheel 61 which may be equipped with buckets or vanes having cavities or chambers between them as shown in FIGS. 2–9. Two different levels, separated by shrouding 54a, are illustrated. The outer level is enclosed by shrouding 54. The combustion chambers or cavities for passages of unburned air may be spaced throughout the two levels or all of one may be on one level only, depending upon the amount of cooling and thrust required. The wheel is surrounded by cowling 55 and the addition of compression blading before or after wheel 61 is optional. The unburned gases may also be compressed in passing through the wheel blading for subsequent burning. The discharge gases are separated by cowling 55a.

In FIG. 11 is shown another embodiment of an engine on one part, having two levels being formed by shrouding 56 and 56a which are in turn surrounded by a cowling 57. Cowling 57 is cut away to allow the wheel to fit into it. The discharge from each of the levels is separated by another cowling 57a. This again shows a wheel 61a, as 61 in FIG. 9, having a hollow axle for the distribution of fuel as described below.

FIG. 12 is a schematic view taken along the line 12—12 of FIG. 10 where the shrouding 54 and 54a provide two levels for combustion chambers or cooling air passages, and the guide vanes forming them are shown as straight lines 58 and 58a.

FIGS. 13 and 14 illustrate the passage of the fuel from the fuel tanks through the hollow axle into the combustion chambers. Supports 7a are attached to the main cowling and are connected to the fuel tanks by passage 63d which enters nose 80 on the turbine engine. On nose 80 is hollow axle 65, bearing mounted and provided with labyrinth packing to prevent leakage around the turning axle. Fuel flows from passage 63c in hollow axle 65 to passage 63a, and thence into fueling vane 63 from which the fuel 63b is injected into a combustion chamber by centrifugal force produced by rotation of the wheel. This wheel is also surrounded by a shrouding 64. Turbine wheel 71, surrounded by shrouding 64, is again an illustration of a complete combustion turbine in one part to which the addition of compressor blading before or after the wheel is optional.

This invention is applicable for stationary as well as for movable units, such as aircraft. Gasoline, kerosene, powdered coal, or powdered magnesium, are among the fuels which can be used.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A combustion turbine comprising: a turbine wheel; a plurality of combustion chambers on the external peripheral surface of said wheel, each of said combustion chambers formed between at least two axially spaced guide vanes extending radially outwardly from said peripheral surface of said wheel, each of said guide vanes forming said chambers being generally directed at an acute angle with and having leading edges toward the direction of rotation of said wheel, each chamber having an air inlet formed between said leading edges, said leading edges of said guide vanes in each of said chambers being in mutually exclusive transverse planes perpendicular to the axle of said wheel, one of said vanes in each of said chambers being forward of the other in the direction of rotation, each rearward vane leading its respective forward vane in the axial direction; means to supply fuel to each of said chambers including at least one fueling vane spaced between the guide vanes forming said chamber, said fueling vanes having fueling orifices directed to supply fuel to each of said chambers in a direction generally away from the direction of rotation of said turbine and generally in the direction of the air flow through said chamber; and cooling passages extending between said combustion chambers.

2. A combustion turbine according to claim 1 in which guide vanes extend radially from said wheel and are disposed externally of and between said chambers in said cooling passages.

3. A combustion turbine according to claim 1 in which said guide vanes are made of a plurality of parts having spaces therebetween.

4. The invention according to claim 1 in which some of said guide vanes are disposed radially at different levels from others and similarly form individual combustion chambers at said different levels, and shrouding connecting said guide vanes and forming said levels.

5. A combustion turbine engine comprising: an air inlet; a compressor, said compressor having rotating blades alternatively spaced with stationary blades; a combustion turbine wheel having a common axle with said rotating blades of said compressor, said compressor rotating with said turbine wheel, said compressor and said wheel being adjacent to each other on said axle; stationary vanes between said compressor and said turbine, said turbine wheel having a plurality of combustion chambers extending radially outwardly from the periphery thereof, each of said chambers being formed between a first and second spaced guide vane, each first and second guide vane disposed on said periphery with a leading edge toward said compressor, the leading edges of said first and second guide vanes of each chamber being in mutually exclusive planes which are at right angles to said axle, said first vane in each of said chambers being forward of the second in the direction of rotation, each second vane leading its respective first vane in the axial direction; means to supply fuel to each of said chambers; cooling passages between each of said chambers; some of said guide vanes being disposed radially at different levels from others so as to form individual combustion chambers at said different levels; and shrouding connecting said guide vanes and forming said levels.

6. A combustion turbine comprising: a turbine wheel, a plurality of combustion chambers on the periphery of said wheel, at least two axially spaced vanes forming each of said chambers, cooling passages between each of said chambers, and means to supply fuel to each of said chambers including at least one vane in each of said chambers having fuel supply orifices directed toward said chamber, said orifices being connected to a fuel supply passage through said last-mentioned vane, said last-mentioned vane having the inner face thereof forming a part of the inner surface of said chamber, said fuel supply orifices being directed to supply fuel to said chamber in a direction generally away from the direction of rotation of said turbine wheel and generally in the direction of the air flow through said chamber.

7. A combustion turbine comprising: a turbine wheel rotatable on an axle, at least two guide vanes on said wheel forming a combustion chamber there between, said vanes being axially spaced extending radially outwardly from the external peripheral surface of said wheel, said combustion chamber being on said external peripheral surface, said vanes being generally directed at an angle with and having leading edges toward the direction of rotation of said wheel, said chamber having an air inlet formed between said leading edges, said leading edges of said vanes being in mutually exclusive transverse planes perpendicular to the axle of said wheel, one of said leading edges being disposed forwardly towards the direction of rotation and axially away from the air inlet, the other of said leading edges being disposed axially towards said air inlet and relatively rearwardly away from the direction of rotation with respect to said one leading edge, and a third vane spaced between said guide vanes adjacent said air inlet and extending in the general direction of said guide vanes, said third vane having a fuel passage therein connected to an orifice in said vane to discharge fuel within said chamber, said orifice being directed to supply fuel to said chamber in a direction generally away from the direction of rotation of said wheel and generally in the direction of the air flow through said chamber.

8. A combustion turbine according to claim 7 in which said fuel passage in said third vane extends radially outwardly from the center of said wheel so as to supply fuel to said chamber by centrifugal force developed by the rotation of said wheel.

References Cited in the file of this patent

UNITED STATES PATENTS

| | | |
|---|---|---|
| 1,569,607 | Beck | Jan. 12, 1926 |
| 2,425,904 | Vernon | Aug. 19, 1947 |
| 2,457,936 | Stalker | Jan. 4, 1949 |
| 2,579,049 | Price | Dec. 18, 1951 |
| 2,595,999 | Way et al. | May 6, 1952 |
| 2,603,947 | Howard | July 22, 1952 |
| 2,630,676 | Seifert | Mar. 10, 1953 |
| 2,630,677 | Seifert | Mar. 10, 1953 |
| 2,632,300 | Brzozowski | Mar. 24, 1953 |
| 2,644,298 | McLeod et al. | July 7, 1953 |
| 2,648,196 | Mullen et al. | Aug. 11, 1953 |

FOREIGN PATENTS

| | | |
|---|---|---|
| 616,635 | Great Britain | Jan. 25, 1949 |